Jan. 31, 1928.　　　　　　　　　　　　　　　　1,657,484
H. T. RATZLAFF
AUTOMOBILE BED
Filed March 26, 1926　　　　3 Sheets-Sheet 1
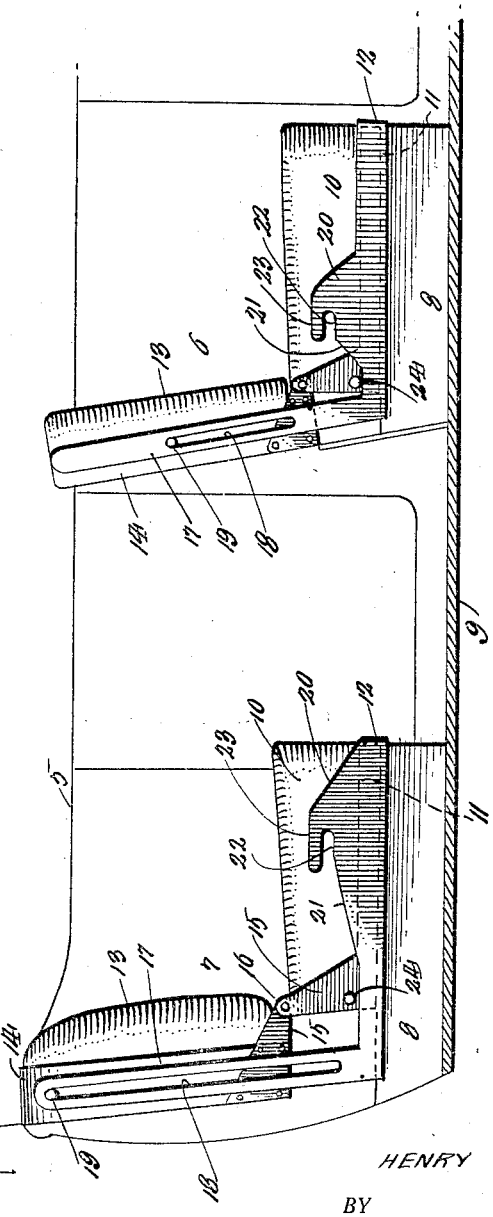
INVENTOR.
HENRY T. RATZLAFF
BY
　　　　ATTORNEY.

Jan. 31, 1928.
H. T. RATZLAFF
1,657,484
AUTOMOBILE BED
Filed March 26, 1926    3 Sheets-Sheet 2
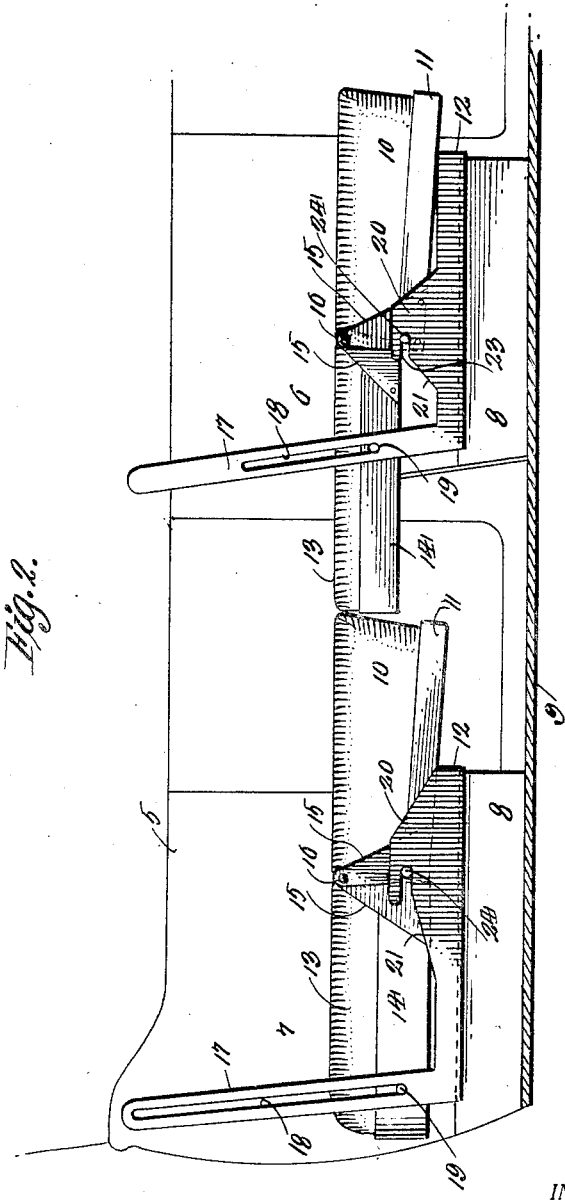
WITNESSES
INVENTOR.
HENRY T. RATZLAFF
BY
ATTORNEY.

Jan. 31, 1928.

H. T. RATZLAFF 1,657,484

AUTOMOBILE BED

Filed March 26, 1926

WITNESSES
Guy M Spring

Inventor
HENRY T. RATZLAFF

By
Richard B Owen
Attorney

Patented Jan. 31, 1928.

1,657,484

UNITED STATES PATENT OFFICE.

HENRY T. RATZLAFF, OF OAKLAND, CALIFORNIA.

AUTOMOBILE BED.

Application filed March 26, 1926. Serial No. 97,727.

This invention relates to certain new and useful improvements in automobile beds, and has more particular reference to an improved and simplified front and rear seat construction for automobiles by means of which the back rest and seat bottom members of such seats may be shifted expeditiously and with minimum effort, so as to assume horizontal positions in co-extensve relation to form a comfortable bed bottom, or readily returned with minimum effort and expeditiously to their normal positions.

A further object is to provide a seat construction of the above kind wherein simple and effective means is provided for retaining the back rest and seat bottom sections of the seats in their normal seat forming relations, for guiding such seat sections from their normal positions to their horizontal bed bottom forming positions, and for effectively supporting the seat members when shifted to form the bed bottom.

Still another object is to provide a seat construction of the above kind which represents a most simple change in and modification of present seat constructions, whereby the same may be installed upon automobiles at a minimum cost.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views—

Figure 1 is a fragmentary longitudinal sectional view of an automobile body equipped with front and rear seats constructed in accordance with the present invention, the seats being shown in side elevation and in normal condition;

Figure 2 is a view similar to Figure 1 with the back rest and seat bottom members of the seats shifted to horizontal position in co-extensive relation to form a bed bottom; and Figure 3 is a top plan view of the device, the shifted position of the seat members being indicated by dotted lines.

Figure 8:
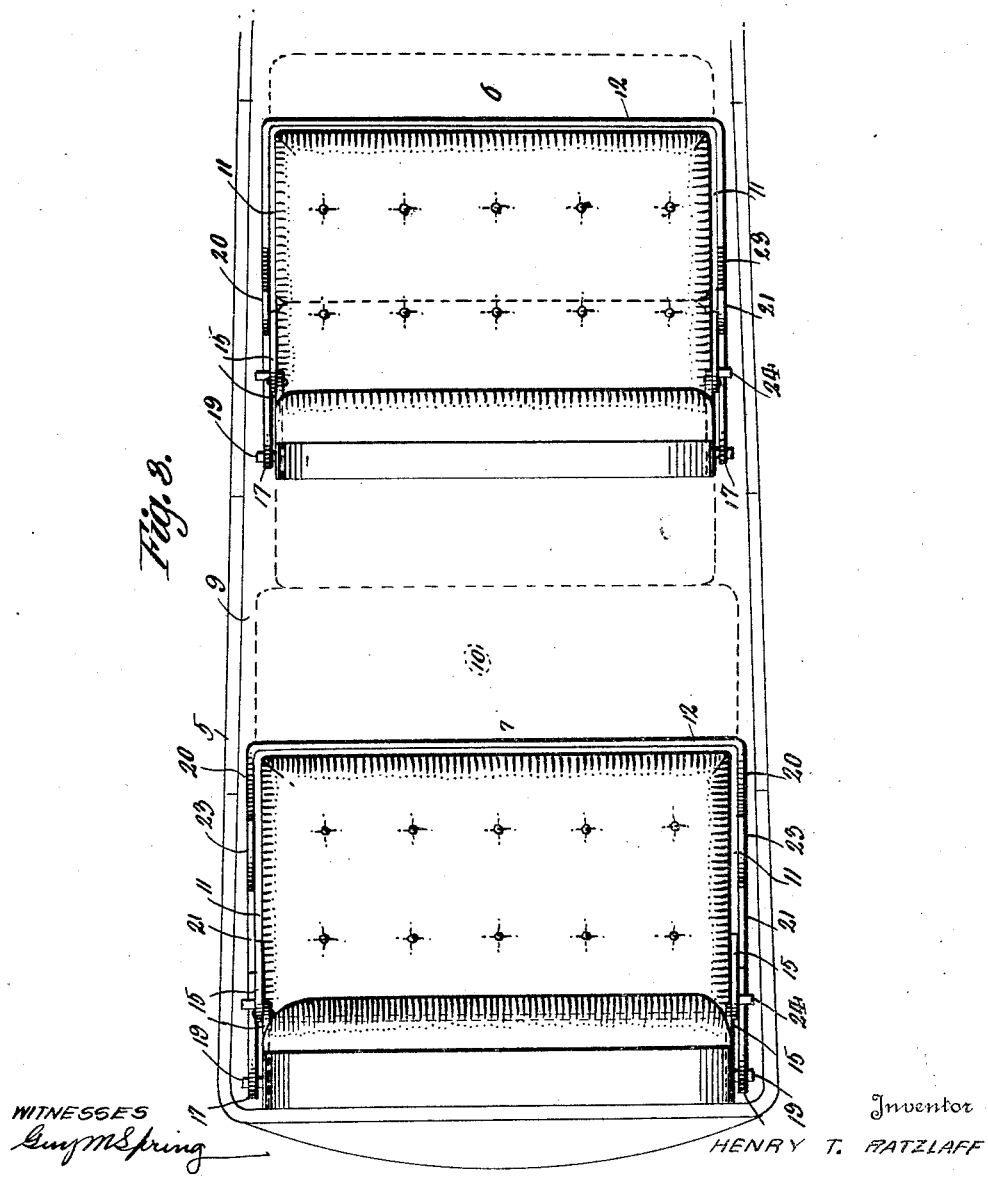

Referring more in detail to the drawings, the numeral 5 indicates a conventional form of automobile body having front and rear seats as generally indicated at 6 and 7, and arranged as is customary in construction of bodies of the touring and sedan types. In such usual constructions, each seat embodies a low-built supporting base 8 rigidly constructed upon the floor 9 so as to extend from side to side of the body and to have the seat bottom sections of the seats removably placed thereon, each seat bottom section usually embodying a cushion 10 carried by a frame 11. In ordinary seat constructions, a U-shaped metallic rim is fixed to the upper side of the base 8 so as to extend along the sides and front of the latter and project above the same, and such a rim is employed in the present instance as indicated at 12. The seat bottom member or section of each seat, when seated upon its supporting base 8 is also seated within the portion of the rim 12 which projects above the upper end of the base 8 whereby accidental displacement of the seat bottom member from its position upon the base 8 is prevented although manual displacement thereof is permitted. In removing the seat bottom member or section it is simply necessary to lift the forward end thereof upwardly so that the member or section may ride over the upper edge of the forward transversely extending intermediate portion of the rim 12. Thus far described, the construction is substantially the same as present seat constructions.

In ordinary automobile seat constructions, each seat embodies a back rest section mounted in a substantially upright position and permanently built in the body in such position. Such back rest members or sections of the seats, in accordance with the present invention, preferably embody suitable cushions 13 mounted in a suitable frame 14 and constructed separate from the body 5 so as to be shiftable with respect to the latter.

In accordance with the present invention the back rest and seat bottom sections of each seat are hingedly connected at adjacent ends so that said sections may assume an angular relation when forming the seat as shown in Figure 1 or a horizontal co-extensive relation as shown in Figure 2 when forming part of a bed bottom. For this purpose, brackets 15 are secured to the sides of the adjacent ends of the seat sections, such brackets being in the nature of plates mutually connected by pivot pins 16 at the adjacent upper corners of the seat sections. In accordance with the present invention, the rim 12 of each seat supporting base is provided near the rear ends of the side members thereof with rigid upwardly projecting arms 17 which are longitudinally slotted substantially from end to end thereof as indicated at 18, and secured to and projecting laterally from opposite sides of the frame 14 of the associated back rest near the upper end of the latter are guide pins 19 which project into the slots 18 of the arms 17 and are capable of sliding movement in such slots. It will now be apparent that when the forward end of the seat bottom section of each seat is lifted above the upper edge of the forward intermediate portion of the rim 12, such seat bottom section may be pulled forwardly, and the attached back rest section or member will be pulled forwardly at its lower end, the pins 19 riding downwardly in the slots 18, the upper end of the back rest at the same time lowering. When the pins 19 reach the lower ends of the slots 18, the upper end of the back rest section will be supported against further lowering movement, and the attached seat bottom section will be disposed in a forwardly shifted position with its intermediate portion resting upon the upper edge of the intermediate portion of the rim 12 as shown in Figure 2.

As shown, the forward end portions of the side members of the rim 12 of each seat base are formed with upwardly projecting extensions 20, which are provided with forwardly and upwardly inclined upper edges as indicated at 21. As shown clearly in the several views, each rim extension 20 has an elevated horizontal upper edge portion 22 leading forwardly from the upper forward end of the inclined edge 21, and projecting upwardly and then rearwardly from the extension 20 at the forward end of the horizontal edge 22 is a horizontal arm 23 having a horizontal lower edge overlying the horizontal edge 22 and cooperating with the latter to form a horizontal slot open at its rear end. Rigid with and projecting laterally from each hinge bracket 15 is a pin 24, and, when the seat bottom is drawn forwardly, the pins 24 ride along the upper edges of the side members of the associated rim 12, then forwardly up the inclined edges 21 onto the horizontal edges 22 beneath the fingers or arms 23 as shown in Figure 2. When the pins 24 strike the forward ends of the slots, further forward shifting movement of the seat section will be prevented, and at this time the pins 19 will be in the lower ends of the slots 18 and in substantially the same plane as the pins 24. Obviously, this construction provides means for elevating the connected ends of the back rest and seat bottom sections of each seat and supporting them at such elevation as to correspond with the elevation at which the outer ends of the seat sections are supported, respectively, by resting upon the upper edge of the intermediate portion of the rim 12 and by engagement of the pins 19 in the lower ends of the slots 18.

It is necessary that the back rest member of the front seat be positioned so as to cooperate with the seat bottom section of the rear seat to span the space between the two seats, and consequently, the normally upper portion of the back rest member of the front seat when lowered to a horizontal position must project rearwardly from the forward arms 17. In order to insure of this disposition of the sections, the pins 19 of the forward back rest section are located at a lower point than the pins 19 of the back rest member of the back seat, or substantially midway between the upper and lower ends of said forward back rest section. By reason of such arrangement of the pins 19 of the forward seat, the slots in the forward arms 17 need not extend upwardly as far as the slots in the rear arms 17. Furthermore, by reason of this construction it is evident that the seat bottom section of the forward seat cannot be shifted forwardly for as great a distance as is the case with the seat bottom section of the rear seat. Consequently, the extensions 20 of the rim 12 of the forward seat are provided nearer the rear ends of the side members of such forward rim 12 as shown. This necessitates making the inclined edges 21 of the extensions 20 on the forward rim 12 shorter and steeper than the corresponding inclined edges 21 on the rear rim 12.

In operation, assuming that the seats are in normal position as shown in Figure 1, and that it is desired to convert the seats into a bed bottom, the seat bottom sections of the seats will be lifted clear of the rims 12 and then shifted forwardly as far as possible, whereupon the seat sections will automatically assume horizontal positions in co-extensive relation as shown in Figure 2. Obviously, this operation can be accomplished with great facility and minimum effort. Should it then be desired to return the seat sections to their normal positions, this may be accomplished by lifting upwardly upon the rear end of each back rest section and simultaneously pressing forwardly upon the attached seat bottom section.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In an automobile bed, an automobile body provided with spaced front and rear seats, each of said seats embodying a forwardly slidable seat bottom section and a back rest section hinged to said seat bottom section at the adjacent ends of the sections, means supporting the back rest section of each seat for vertical sliding and swinging movement whereby the same may lower and assume a horizontal position upon forward sliding movement of the attached seat section, to permit all of the seat sections to assume a horizontal co-extensive relation, a fixed support upon which each seat bottom section is adapted to be placed when the back rest sections are vertically disposed, a rim upon the upper end of each supporting base within which the associated seat bottom section is adapted to fit whereby lifting of the forward end of the seat bottom section is required for permitting shifting thereof and lowering of the attached back rest section, means to cause elevation of the adjacent ends of the sections of each seat upon forward sliding of the seat bottom section thereof, said last named means comprising upwardly extending projections upon the sides of each rim having inclined edges leading upwardly and forwardly to rearwardly facing horizontal notches in the projections, and laterally projecting pins rigid with the sides of each seat bottom section adjacent the rear end of the latter and arranged to ride on said inclined edges into the notches.

2. In a convertible seat structure for automobiles, front and rear seat structures each including a supporting base having a rim extending at the sides and front thereof, front and rear seats each including a bottom section and a back rest section, the bottom section of each seat being supported upon the respective base and normally within the rim thereof, bracket members carried by the relatively adjacent ends of the bottom and back rest sections of each seat, means pivotally connecting the bracket members of each seat, uprights positioned substantially at the rear corners of each base and having longitudinal slots, pins projecting laterally from the opposite sides of the back rest section of each seat and working in said slots in the respective uprights, the side members of the rim of each base having upward extensions and each extension having an upwardly inclined upper edge and a straight horizontal edge portion at the forward end of the upwardly inclined edge, each extension being further provided with a rearwardly projecting portion overhanging the horizontal edge portion of the extension to define a rearwardly presented notch in the extension, and pins projecting laterally from the brackets of the bottom sections of the seats and resting in engagement with the upper edges of the side members of the rims of the respective bases and adapted to ride upwardly upon the inclined upper edges of the extensions of said side members of the rims and into the said notches, upon forward displacement of the bottom section of each seat.

In testimony whereof I affix my signature.

HENRY T. RATZLAFF.